June 14, 1960     W. C. COTTONGIM ET AL     2,940,381

BARBECUE STOVE

Filed Aug. 15, 1957     3 Sheets-Sheet 1

INVENTORS:
WILLARD C. COTTONGIM
GEORGE H. FULLERTON
BY
ATTORNEY

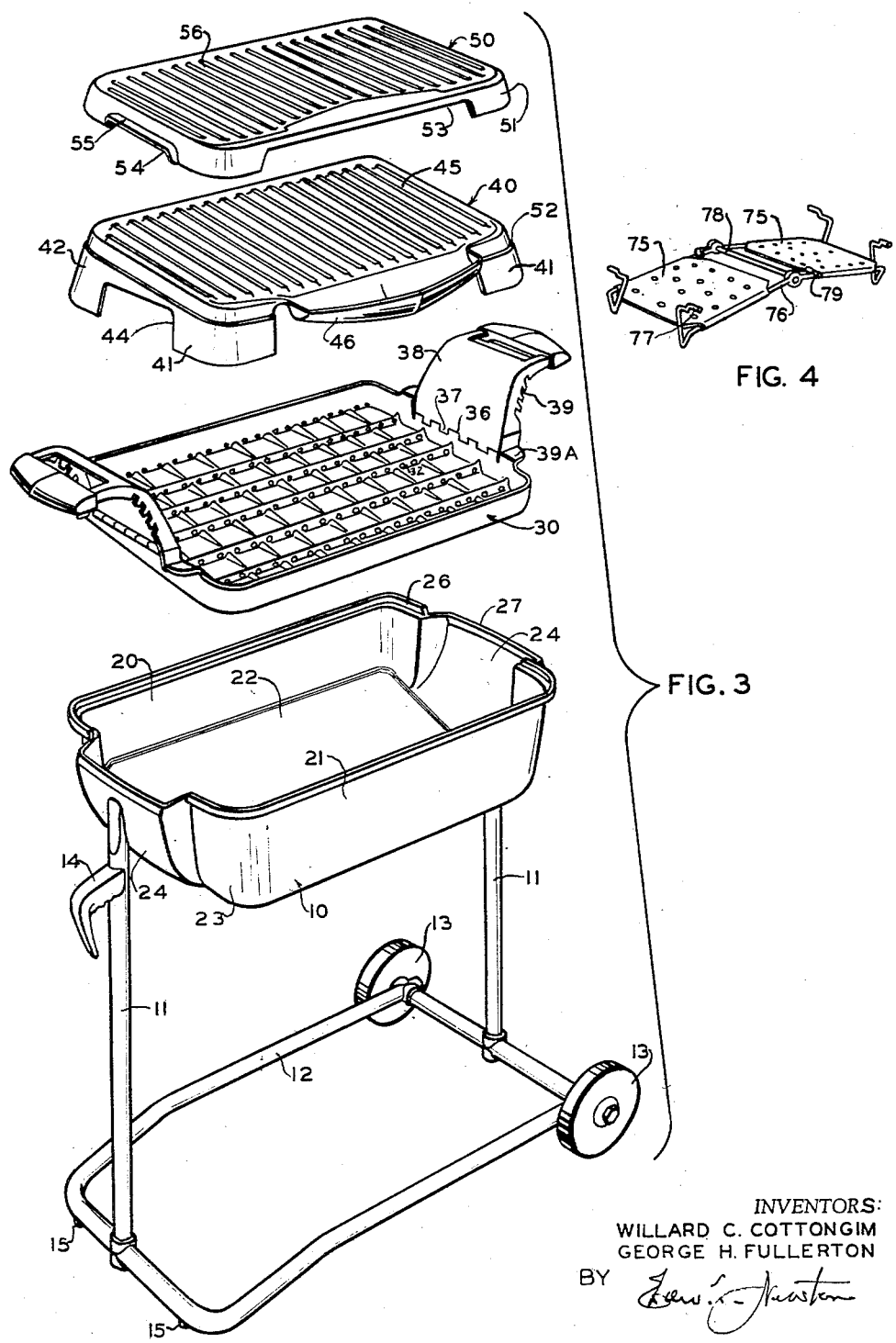

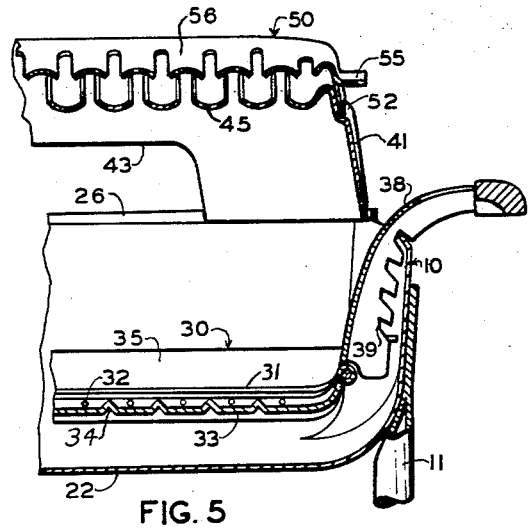
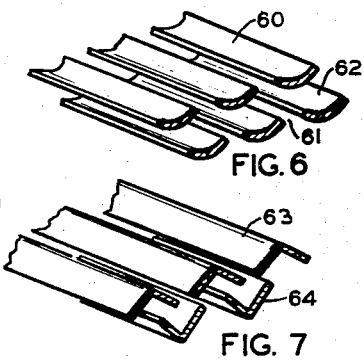
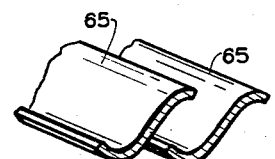
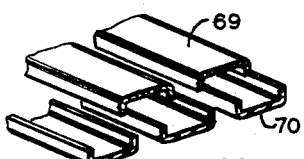
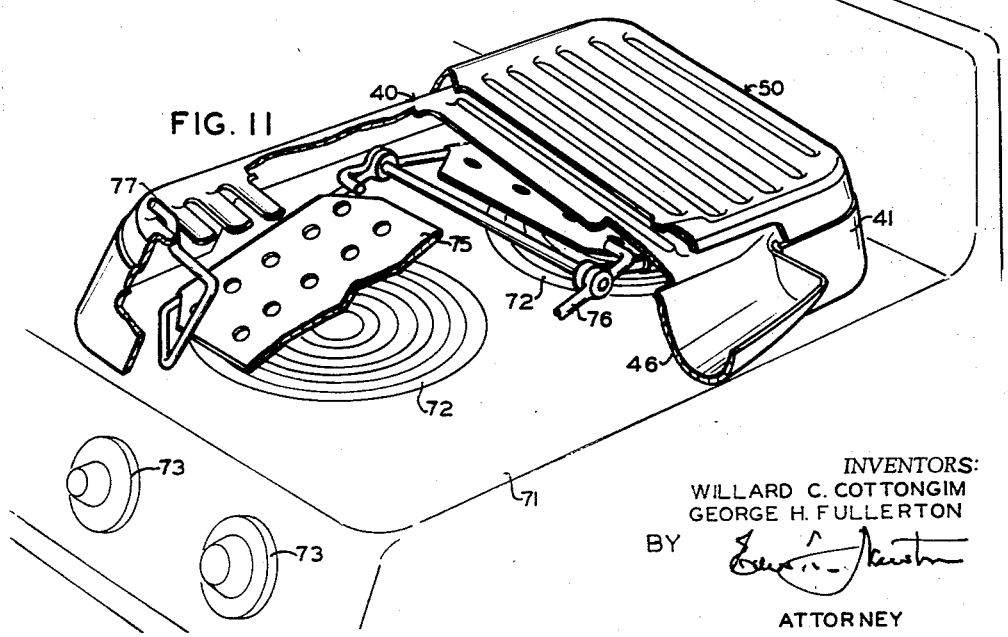
INVENTORS:
WILLARD C. COTTONGIM
GEORGE H. FULLERTON

United States Patent Office 2,940,381
Patented June 14, 1960

2,940,381

BARBECUE STOVE

Willard C. Cottongim, Atlanta, and George H. Fullerton, Smyrna, Ga.; said Fullerton assignor to said Cottongim Filed Aug. 15, 1957, Ser. No. 678,326

18 Claims. (Cl. 99—445)

This invention relates to barbecue stoves and is particularly concerned with multipart stoves of the type currently in favor for the outdoor cooking of foods over open fires such as those using charcoal, or the like, as fuel. The inventive concept, however, is not wholly limited to such use, since the invention includes the provision of a unique grill assembly which may be used on more conventional domestic stoves using oil, gas, or electricity as the heating medium.

With the present popularity of outdoor cooking, many new and ingenious stove structures have been developed for the convenience of cooking such foods as steaks, hamburger patties and hot dogs over charcoal fires. In the development of such devices, economy of manufacture, simplicity of construction and ease of manipulation have been primary factors in design. For the most part, these objectives have not wholly provided for ideal arrangements with respect to adjustability whereby the height of the cooking surface may be conveniently altered with respect to the course of the heat. Such provision is desirable so as to conform with differing requirements of heat for various types of food and with differing intensities of the heat source. Another feature which has not been adequately dealt with is with respect to the draining away of cooking liquors, fats and greases so as to avoid contamination of the burning fuel and to preserve such liquids for future use. Another factor which is desirable in such stoves is the provision of means whereby the grill may be readily detached for use over more domestic types of cooking facilities.

In the construction of the present device, these and other features are provided for in a structure which may be broadly defined as providing a combustion chamber shown as generally rectangular in form and suitably supported by a wheeled frame so as to be readily movable. A perforate, removable and vertically adjustable fuel tray or grate is adapted to be received within the combustion chamber to retain charcoal or like fuel in upwardly spaced relation from the closed lower wall of the chamber so as to provide for adequate circulation of air through the burning fuel while the closed bottom retains ash and debris formed by the combustion of such fuel. The present form of the invention further provides a lower grill characterized by the provision of transversely extending, spaced liquid receiving troughlike grill bars which deliver cooking juices, developed in the cooking of food, to a liquid well where they may be collected without loss and without permitting them to contaminate the burning fuel. A further important feature of the present invention is the provision of an upper food supporting grill having transversely extending food supporting grill bars which are designed to be positioned intermediate the spaces between the bars of the lower grill so as to permit the discharge of cooking liquids from the food to such lower grill bars. The present construction is designed for easy separation for storage and for cleaning purposes and further provides for the removal of the upper grill and lower grill as an assembly over more domestic type of cooking facilities such as electric or gas stoves.

Therefore, it is among the objects of the present invention to provide a novel, simple, and improved outdoor barbecue stove formed by the interrelation of separate instrumentalities which may be readily disassembled for cleaning and which permits the use of certain elements independently of others.

Another object of the present invention is to provide a stove including a novel and improved means by which the position of the fuel may be vertically adjusted with respect to the cooking surface without disturbing the combustion chamber location and/or the cooking surface.

It is also an object of the present invention to provide in a device of the character described novel and improved means for draining away and collecting cooking liquors which may be exuded during the cooking operation so as to protect the burning fuel from contamination by such liquors and to provide for the further use thereof if desired.

A further object is to provide in a device of the character described, improved means for supporting charcoal or the like fuel in such manner as to allow adequate flow of air for combustion and to preclude the discharge of ash and refuse from such burning fuel.

These and numerous other objects, features and advantages of the present invention will be apparent from a consideration of the following specification, taken in conjunction with the accompanying drawings, in which:

Fig. 3 is an exploded view of that form of the invention showing the parts shown in Fig. 1 in spaced relation;

Fig. 4 is a detail perspective view of a heat diffuser which may be used when the grill is used over a conventional electric or gas stove;

Fig. 5 is a detail sectional view taken on line 5—5 of Fig. 2;

Figure 1:
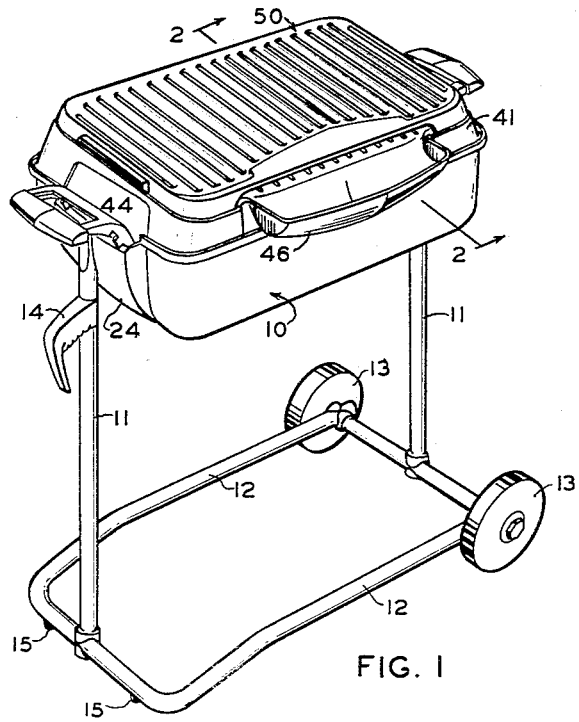
Fig. 1 is a perspective view of the invention as assembled from the parts illustrated in Fig. 1.

Figs. 6, 7, 8, 9, and 10 are fragmentary perspective views of various modifications of the grill bars;

Fig. 11 is a perspective view illustrating the use of the grill elements on a conventional domestic stove using the heat diffuser of Fig. 4.

In that form of the invention here presented, a fire pot or combustion chamber generally identified by the numeral 10 is shown as mounted on opposed vertical standards 11 of a wheeled frame 12. A pair of wheels 13 which support the structure for movement to and from varied locations of use when the frame is tilted and manipulated by the handle 14. When in use the end of the frame opposite the wheels 13 is supported by the downwardly projecting pads 15. As here indicated, the frame and vertical standards may be conveniently and inexpensively formed of tubular stock material to provide a lightweight, rugged and durable support for the combustion chamber 10. The combustion chamber 10 which constitutes a grate and grill assembly support is generally rectangular in horizontal cross section including a relatively narrow substantially vertical rear wall 20 and a generally vertical wider front wall 21 both of which are imperforate and both of which merge into an imperforate forwardly and downwardly sloping bottom wall 22. The ends 23 are formed with central outwardly sloping bays 24 for the extension from the combustion chamber of the handles of a fuel rack or grate hereinafter discussed. While the bottom 22 of the combustion chamber slopes forwardly, the upper free edges of the front, side and end walls lie in a horizontal plane, these edges being formed with upwardly projecting flanges 26 to receive and retain a superposed grill assembly. The upper edges 27 of the bays 24, however, are not provided with flanges but are turned inwardly to cooperate in the manner hereinafter discussed with the handle structure of the fuel grate. These edges 27 being horizontal and downwardly spaced in parallel relation to the upper edges of the flanges 26.

Figure 2:
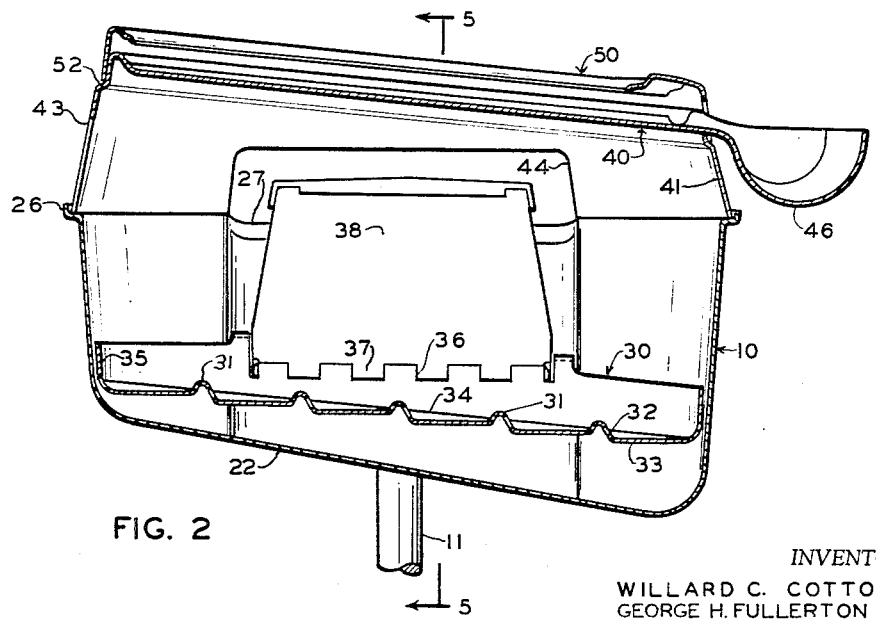
Figure 2 is a vertical sectional view taken on the line 2—2 of Fig. 1.

The grate, generally indicated by the numeral 30, comprises a generally rectangular tray-like member adapted to fit within the combustion chamber in spaced relation to the bottom and in a forwardly and downwardly inclined position. As best seen in Fig. 2, the bottom of the grate is formed with longitudinally extending perforated inverted V-shaped ribs 31, having perforations as at 32 formed on both faces thereof. The rear faces of the ribs are shorter so as to provide for a stepped parallel and horizontal relation of the successive intermediate flat surfaces 33 between the ribs. Between the ribs transversely extending tapered cross ribs or shoulders 34 are provided which diminish in height from each rib forwardly to conform with the stepped relation of the ribs 31. By this relation, it will be seen that fuel, such as charcoal, mounted on the grate will be uniformly supported in a generally horizontal position but with the combustion surface forwardly and downwardly inclined, the apertures of the grate providing ample opportunity for upward passage of combustion supporting air through the grate. The edges of the grate are formed with a flange 35 generally conforming with the configuration of the inner wall of the combustion chamber. As seen in Fig. 3, the ends of the grate are formed with piano type hinge elements 36 between which are interdigitated the hinge elements 37 connecting the grate structure to end handles 38 which are upwardly tapering channel members provided with ears and recesses formed as edge serrations 39 so as to support the grate in a selected vertical position with respect to the combustion chamber and therefore the grill assembly supported thereon. It will be understood that the location of the piano type hinge arrangement formed by the elements 36 and 37 is in a horizontal plane so that vertical adjustment by selective engagement between the edge 27 and the serrations 39 will not alter the inclination of the fuel supporting structure of the grate.

The grill assembly of the present stove is composite in nature including upper and lower separable grill elements. The lower grill, generally indicated by the numeral 40, is substantially rectangular conforming to the rectangular configuration of the combustion chamber 10 and the grate 30. The grill 40 is formed with front and rear corner legs 41 and 42, respectively, the legs 42 being higher than the front legs 41 so as to dispose the upper grill surface in a forwardly and downwardly inclined position when the legs are seated within the horizontal flange 26 of the combustion chamber. The open rear 43 of the lower grill 40 provides for the ample discharge of air from the combustion chamber; and the openings 44, between the front legs 41 and rear legs 42, provide for the outward extension of the handles 38 of the grate so that the grate may be conveniently adjusted as to elevation with respect to the grill without removal thereof from the combustion chamber. It will be noted that handles are tapered in both transverse directions to provide variable air admission, more air being admitted through the virtue of increased spacing as the grate is raised to thus intensify the rate of fuel combustion. Side baffles 39A provide a restriction between the handles 38 and the side walls of each bay 24, with the result that most of the air admitted to the combustion chamber passes through the central tapered passage defined by the handles 38 against the end walls of bays 24 by which accurate control is attained. Since the difference in height between the front and rear legs 41 and 42 provides for the downward inclination of the top of the grill it will be seen that this is in conformity to the inclination provided by the grate so that there is substantial parallism between the grate and the lower grill. It should be noted in this respect that the bottom of the combustion chamber has a greater inclination than the grate, so that the increased spacing therebetween provides for a greater air volume under the lower end of the grate. This has the effect of equalizing heat distribution under the entire grill, since heated air rising from the grate would otherwise have a tendency to concentrate at the upper end of the grill, The upper surface of the lower grill 40 is formed by spaced transverse grill bars 45 which in one preferred form of the invention, as indicated at Fig. 5, are upwardly concave so as to constitute fluid channels to receive and direct grease and cooking liquors exuded from food on the upper grill and permit the same to flow downwardly and forwardly by gravity to be received within a longitudinally extending and transversely concave trough 46 formed at the front of the lower grill and extending between the front legs 41. The trough 46 extends forwardly and outwardly beyond the front surface of the legs 41 and forwardly beyond an upward projection of the front wall 21 of the combustion chamber. Thus, the trough is positioned in such manner as to conveniently provide for the reception of grease and cooking liquors at the front of the stove. Not only does the concave trough-like nature of the transverse ribs of the grill provide for the collection of such grease and cooking liquors, but the same provides for the avoidance of a downward discharge of such fluids onto the burning fuel supported by the grate. Thus, smoke and unpleasant odors frequently generated by the combustion of such materials are avoided and consequent deterioration of food cooked thereover.

The second element of the composite grill assembly consists of the upper grill generally indicated by the numeral 50 which is provided with a peripheral flange 51 adapted to seat on a shoulder 52 of the lower grill 40. At the front of the upper grill 50 the flange 51 is cut away as indicated at 53 directly above the entrance to the trough 46 so as to permit the free flow of fluids into the trough. At the ends, the peripheral portion of the upper grill is cut away as at 54 and bent to form protruding flanges 55 registering with the bays 24 of the combustion chamber, such flanges providing handles by which the upper grill may be conveniently lifted from the lower grill. The central body of the upper grill 50 is formed with spaced ribs 56 which, in that form of the invention shown in Fig. 5, are upwardly convex and are arranged in staggered relation with the upwardly concave ribs 45 of the lower grill. Thus, the ribs are positioned in bridging relation and hence, liquors or such fluids discharged from the edges of the upper grill bars will pour into the trough-like channels of the lower grill bars 45. Such liquors will then flow forwardly and downwardly into the trough 46. While the flange 51 of the upper grill 50 is uniform in height it will be noted that being supported upon the shoulder 52 of the lower grill 40, the surface of the upper grill will be disposed in a similar inclined position.

Thus, it will be seen that in operation of the present grill, fuel supported by the forwardly and downwardly inclined grate 30 will generate heat which passes upwardly through the grill ribs 45 and 56, without contaminating smoke derived from burning grease, to cook food supported on the upper grill ribs 56, and that the cooking liquors and fats exuding under cooking heat will be received in the lower grill ribs to move forwardly by gravity to the trough 46. It will be seen that the surface of the grate is inclined in conformity with the lower inclination of the bottom 22 of the combustion chamber as well as in conformity with the inclination of the grill rods so as to provide uniform air supply space below the grate as well as uniform heat throughout the entire surface of the grill. By manipulation of the handles 38 of the grate and adjustment of the serrations 39 in the edges 27, the spacing between the grate and the grill may be varied without alteration of the parallel inclination of the elements.

As noted in Figs. 6, 7, 8, 9, and 10, the invention is not limited to the lower upwardly concave-convex arrangement of ribs 45 and 56 as shown in Fig. 5. If desired, the upper and lower grill bars may both be formed as upwardly concave and disposed in overlapping relation whereby the upper bars shown at 60 in Fig. 6 may be arranged over the space 61 formed between the lower upwardly concave grill bars 62 of that figure. In this instance, the cooking liquors and fats will be received in both upper and lower grill rods and will be conveyed by gravity forwardly to pass therefrom to the trough 46. In that form of the invention shown in Fig. 7, the grill rods may be generally V-shaped in cross section, the upper rods 63 being in staggered relation with respect to the lower bar 64 and the inverted position of the upper rods will cause the cooking liquors and grease to pass therefrom into the trough formed by the lower rods 64. In Fig. 8 it is seen that the grill may be of the single member provided with generally S-shaped grill rods, the upper curved portion 65 at the side of one rod being disposed over the inversely trough like curved portion 66 of the next adjacent rod so that each rod will form its own trough as well as food supporting surface. In that form of the invention shown in Fig. 9, the food supporting surface is formed by rods 67 which are disposed above overlapping troughs 68 of the bars of a lower element in which case the bars 68 constitute the sole fluid receiving and passing medium. In that form of the invention shown in Fig. 10 the bars are generally U-shaped in cross section, the upper bars being inverted with edges overlying the trough formed by the lower bars 70.

While the present invention provides an ideal outdoor barbecue stove, it will be seen that certain of the features and advantages of the grill arrangement itself may find utility in cooking over indoor domestic stoves or fireplaces. As shown in Fig. 11, the combined upper and lower grill structure of Figs. 1, 2, and 3 may be lifted from the combustion chamber and placed on the upper surface 71 of a conventional domestic stove so as to be disposed over one or more of the burners 72. The burners may be controlled in conventional fashion by the control knob 73. In this use of the invention, it may be desirable to provide for more uniform distribution of heat through the grills to food supported thereon to avoid localized heat rising directly from any one or more of the burners 72. As a means for providing for such uniform distribution of heat, a foldable heat distributing member as shown in Figs. 4 and 11 may be provided which member consists of a pair of perforate heat distribution plates 75 mounted on hingedly related frames 76. The outer terminal portion of the legs of the frame are bent upwardly and then outwardly as at 77 to be received through spaces between the terminal outer bars of the lower grill or may be supported at the upward return bent angle. The frame members are joined by a central pintle 78 and the inner ends of the side arms of the frame may extend beyond the pintle to be turned inwardly as at 79 forming a stop means whereby when unfolded, the heat distributor will maintain an angular relation between the perforate plates so as to uniformly distribute the heat rising from the burners 72.

It will of course be understood that in the practice of the invention, numerous changes, modifications and the full use of equivalents may be resorted to. Various and different mountings may be provided for the combustion chamber which may be either mobile or fixed. The combustion chamber may vary in design as may the grate; and, as indicated in Figs. 6 and 10, a wide variety of grill bar constructions may be provided. Such changes are not deemed to depart from the spirit or scope of the invention as defined in the appended claims.

We claim:
1. A multipart outdoor barbecue stove including an imperforate combustion chamber having an inclined bottom and protruding end bays, said chamber defining horizontal top peripheral edges while said bays define internally turned flanges, a grate having an inclined perforate bottom and hinged handles, said handles defining serrations selectively engageable with the flanges of said bays to provide vertical adjustment of said grate within said combustion chamber, and a composite grill assembly removably supported by the horizontal edges of said chamber, said grill including a lower element and an upper removable element having inclined food supporting ribs spaced in vertical offset relation to the ribs of said lower element.

2. A barbecue stove comprising a combustion chamber, a grill supported by said combustion chamber, a perforate grate disposed in said chamber, handles pivotally secured to said grate, each of said handles including an outwardly opening channel member, said channel member adapted for selective engagement with said chamber so as to permit selective positioning of said grate with respect to said grill, said channel member and chamber defining an air passage of determinable size therebetween to the underside of said grate.

3. A barbecue stove comprising a combustion chamber, a grill supported by said combustion chamber, a perforate grate disposed in said chamber, handles pivotally secured to said grate, each of said handles including an outwardly opening channel member formed with a plurality of recesses, said recesses adapted for selective engagement with said chamber so as to permit selective positioning of said grate vertically with respect to said grill, said channel member and chamber defining an air passage therebetween to the underside of said grate, said channel member being of such configuration that at each selected level of said grate said air passage to the underside of said grate will be of a different size.

4. A barbecue stove comprising a combustion chamber, a grill supported by said combustion chamber, a perforate grate disposed in said chamber, handles pivotally secured to said grate, said chamber formed with opposing bays, each of said handles being so formed as to be adapted for selective engagement with said chamber within one of said bays so as to permit selective vertical positioning of said grate with respect to said grill, said handles being of such configuration with respect to said bays to define an air passage of determinable size therebetween to the underside of said grate.

5. A barbecue stove comprising a combustion chamber, a grill supported by said combustion chamber, a grate vertically positionable with respect to said grill, said grate having apertures therethrough communicating with the underside thereof, and means engageable with said combustion chamber for controlling simultaneously the position of said grate with respect to said grill and the volume of air admitted to said underside in accordance with the vertical position of said grate with respect to said grill.

6. An outdoor stove including a combustion chamber, a grate having an inclined fuel supporting surface disposed in said chamber, a grill carried by said chamber over said grate in parallel relation to said surface, and handle means engageable with said combustion chamber for vertically adjusting said grate with respect to said grill, said handle means including means for controlling the volume of air admitted to said chamber under said grate in accordance with the vertical position of said grate with respect to said grill.

7. In a barbecue stove, a grate member comprising a body having a plurality of substantially horizontal support sections uniformly graduated vertically with respect to each other over substantially the entire grate member, said body further having a downwardly opening rib member between each of said horizontal sections, each rib member defining a plurality of substantially transverse apertures, each of said horizontal sections having a plurality of spaced shoulders, the arrangement of said rib members and shoulders being such as to tend to retain fuel placed on said grate member uniformly distributed throughout the combustion process.

8. In a barbecue stove, a combustion chamber, a vertically positionable perforate grate disposed in said chamber, an outwardly opening and upwardly tapering channel member on each side of said grate, said chamber formed with opposing bays each having substantially upright side walls, each channel member adapted to be received within one of said bays so as to define an air passage of determinable size therebetween to the underside of said grate, and a pair of baffles on each side of said grate, one on each side of each channel member in registration within one of said bays to prevent air from by-passing said air passage irrespective of the vertical position of each channel member.

9. In a barbecue stove, a combustion chamber, a grill supported on said combustion chamber, a vertically positionable perforate grate disposed in said chamber, handles pivotally secured to opposite sides of said grate, said chamber formed with opposing bays, each of said handles being so formed as to be received within one of said bays for selective engagement with said chamber so as to provide for selective vertical positioning of said grate with respect to said grill, each of said handles and bays defining an air passage of determinable size therebetween to the underside of said grate, and a pair of baffles on each side of said grate adjacent said handles, so that upon vertical positioning of said grate with respect to said grill each pair of ears will be in slidable registration within one of said bays to prevent air from by-passing said air passage.

10. In a barbecue stove, a combustion chamber, an inclined perforate grate having upper and lower ends disposed in said chamber, handles secured to said grate, each of said handles adapted for selective vertical engagement with said chamber so as to define an air passage of determinable size therebetween to the underside of said grate, each of said handles being so secured to said inclined grate that said air passage communicates to the underside of said inclined grate intermediate the upper and lower ends thereof.

11. In a barbecue stove, a grate having a fuel support surface with a plurality of substantially horizontal support sections uniformly graduated vertically with respect to each other, said fuel support surface also having a plurality of inverted U-shaped ribs each with a shorter side and a longer side, said fuel support surface further having one of said ribs between adjacent horizontal support sections with said shorter side joining one such section and said longer side joining another such section, each of said ribs defining a plurality of substantially transverse apertures in the sides thereof.

12. In a barbecue stove, a grate having a fuel support surface with a plurality of substantially horizontal support sections uniformly graduated vertically with respect to each other over the entire fuel support surface, said fuel support surface further having a plurality of equally spaced, downwardly opening ribs each between adjacent horizontal support sections, each of said ribs defining a plurality of substantially transverse apertures, each of said horizontal support sections having a plurality of equally spaced shoulders, the spacing of said ribs being substantially equal to the spacing of said shoulders so as to tend to retain fuel placed on said grate uniformly distributed.

13. A barbecue stove comprising, a combustion chamber having a uniformly inclined bottom, a perforate grate having an inclined fuel supporting surface disposed in said chamber, a grill carried by said chamber over said grate in parallel relation to said fuel supporting surface, the angle of inclination of said fuel supporting surface being less than the angle of inclination of said bottom, handles pivotally secured to said grate, each of said handles including an outwardly opening channel member formed with a plurality of recesses, said recesses adapted for selective engagement with said chamber so as to permit selective positioning of said grate vertically with respect to said grill, said channel member and chamber defining an air passage therebetween to the underside of said grate, said channel member being of such configuration that at each selected level of said grate with respect to said grill said air passage to the underside of said grate will be of a different size.

14. A barbecue stove comprising, a combustion chamber having a uniformly inclined bottom, a grate having an inclined fuel supporting surface disposed in said chamber, a grill carried by said chamber over said grate in parallel relation to said surface, the angle of inclination of said fuel supporting surface being less than the angle of inclination of said bottom, handles secured to said grate, each of said handles including an outwardly opening channel member, said channel member adapted for selective vertical engagement with said chamber so as to permit selective positioning of said grate with respect to said grill, said channel member and chamber defining an air passage of such configuration therebetween to the underside of said grate that at each selected level of said grate with respect to said grill said air passage will be of a different size.

15. A barbecue stove comprising a combustion chamber having a uniformly inclined bottom, a perforate grate having an inclined fuel supporting surface disposed in said chamber, a grill carried by said chamber over said grate in parallel relation to said surface, the angle of inclination of said fuel supporting surface being less than the angle of inclination of said bottom, handles secured to said grate, said chamber formed with opposing bays, each of said handles adapted to be received within one of said bays so as to define an air passage of determinable size therebetween to the underside of said grate, each of said handles being so formed as to be adapted for selective vertical engagement with said chamber so as to permit selective positioning of said grate vertically with respect to said grill.

16. A barbecue stove comprising a combustion chamber having a uniformly inclined bottom, an inclined perforate grate having an inclined fuel supporting surface with its upper and lower ends disposed in said chamber, a grill carried by said chamber over said grate in parallel relation to said surface, the angle of inclination of said fuel supporting surface being less than the angle of inclination of said bottom, handles pivotally secured to said grate, each of said handles including an outwardly opening channel member formed with a plurality of recesses, said recesses adapted for selective engagement with said chamber so as to provide for selective positioning of said grate with respect to said grill, said channel member and chamber defining an air passage therebetween to the underside of said grate, said channel member being of such configuration that at each selected level of said grate with respect to said grill said air passage to the underside of said grate will be of a different size, each of said handles being so secured to said inclined grate that said air passage communicates to the underside of said inclined grate intermediate the upper and lower ends thereof.

17. An outdoor composite stove including a grate support, a perforated grate disposed within said grate support, a lower grill removably supported on the surface of said grate support, an upper grill removably supported on the surface of said lower grill, said upper grill having a plurality of parallel spaced food receiving grill bars extending thereacross, there being provided parallel slots between adjacent of said grill bars, said lower grill having complementary grill bars provided with U-shaped channels positioned beneath said slots, a trough connected to said lower grill and communicating with said channels, said trough being adapted to receive liquid falling from food on said grill bars into said channels of said complementary grill bars, means for suspending said grate within said grate support and for adjusting the vertical position of said grate with respect to said lower grill, the surface of said grate and lower grill and upper grill being inclined toward said trough and essentially parallel to each other, and means for adjusting the flow of air between said grate support and said grate in response to the position of said grate within said grate support.

18. In a barbecue stove comprising a combustion chamber, a perforate grate movably disposed in said chamber, handles pivotally secured to said grate, said chamber formed within opposing bays, each of said bays adapted to receive one of said handles so as to define an air passage therebetween to the underside of said grate and means operative within said bays for regulating the flow of air through said air passage, said last mentioned means being responsive to the position of said grate within said chamber.

References Cited in the file of this patent
UNITED STATES PATENTS

| | | |
|---|---|---|
| 3,973 | Hawkins | Mar. 26, 1845 |
| 25,196 | Hill | Aug. 23, 1859 |
| 31,930 | Huntley | Apr. 2, 1861 |
| 41,596 | Bickel | Feb. 16, 1864 |
| 106,059 | Harsha et al. | Aug. 2, 1870 |
| 324,421 | Smead | Aug. 18, 1885 |
| 445,575 | Smith | Feb. 3, 1891 |
| 654,774 | Wood | July 31, 1900 |
| 667,014 | Hull | Jan. 29, 1901 |
| 716,501 | Watson | Dec. 23, 1902 |
| 841,498 | Fitzsimmons | Jan. 15, 1907 |
| 1,293,214 | Scribner | Feb. 4, 1919 |
| 1,629,162 | Holman | May 17, 1927 |
| 2,101,180 | Jacobs | Dec. 7, 1937 |
| 2,403,134 | Stephenson | July 2, 1946 |
| 2,530,166 | Johannsen | Nov. 14, 1950 |
| 2,531,684 | Jackson | Nov. 28, 1950 |
| 2,820,446 | Freeman | Jan. 21, 1958 |
| 2,842,044 | Kirk | July 8, 1958 |

FOREIGN PATENTS

| | | |
|---|---|---|
| 129,109 | Australia | Sept. 30, 1948 |
| 3,969 | Great Britain | 1896 |
| 14,030 | Great Britain | 1895 |